(12) United States Patent
Suzuki et al.

(10) Patent No.: US 6,463,445 B1
(45) Date of Patent: Oct. 8, 2002

(54) MULTIMEDIA INFORMATION RETRIEVAL SYSTEM AND METHOD INCLUDING FORMAT CONVERSION SYSTEM AND METHOD

(75) Inventors: Teruhiko Suzuki, Chiba; Yoichi Yagasaki, Tokyo, both of (JP)

(73) Assignees: Sony Electronics Inc., Park Ridge, NJ (US); Sony Corporation, Tokyo (JP)

( * ) Notice: Subject to any disclaimer, the term of this patent is extended or adjusted under 35 U.S.C. 154(b) by 0 days.

(21) Appl. No.: 09/410,185

(22) Filed: Sep. 30, 1999

Related U.S. Application Data
(60) Provisional application No. 60/151,411, filed on Aug. 27, 1999.

(51) Int. Cl.[7] .............................................. G06F 12/00
(52) U.S. Cl. ........................................ 707/200; 707/203
(58) Field of Search ................................. 707/200, 203; 375/240.01, 240.13–240.16, 240.18–240.2

(56) References Cited

U.S. PATENT DOCUMENTS

| | | | | |
|---|---|---|---|---|
| 5,530,484 A | * | 6/1996 | Bhatt et al. ................... | 348/556 |
| 5,953,506 A | * | 9/1999 | Kalra et al. ............ | 395/200.61 |
| 5,970,233 A | * | 10/1999 | Liu et al. ................ | 395/200.76 |
| 6,104,441 A | * | 8/2000 | Wee et al. ................... | 248/722 |
| 6,141,457 A | * | 10/2000 | Jahanghir et al. ............ | 382/250 |
| 6,192,078 B1 | * | 2/2001 | Komiya et al. ......... | 375/240.16 |
| 6,216,152 B1 | * | 4/2001 | Wong et al. ................. | 709/203 |
| 6,321,026 B1 | * | 11/2001 | Dierke ......................... | 386/95 |

\* cited by examiner

Primary Examiner—James P. Trammell
Assistant Examiner—Mary Wang
(74) Attorney, Agent, or Firm—Wagner, Murabito & Hao LLP

(57) ABSTRACT

A multimedia information retrieval system and method including a method and system for automatic format conversion. The invention includes a data structure that is associated with each multimedia bitstream. The data structure identifies the encoding format, e.g., compression technique, used in the multimedia bitstream which is originated by a contents server. An automatic format conversion process then queries information from the client system (requester) and also receives the data structure identifying the encoding format. The client information identifies the decoding format. The automatic format conversion determines the transcoding process required for converting the bitstream from its encoded format to the format recognized by the client system. The format conversion process of the present invention also determines whether or not decoding is required before transcoding is performed thereby saving processing time and computer resources in those cases where decoding is not required. Moreover, the format conversion process also automatically determines the computer memory size required to perform the transcoding process thereby saving computer memory resources. The format converter can be implemented in software as an application and can also be integrated within a data access server. The data access server can be integrated within the client system or within the contents server. The format converter of the invention is particularly useful for electronic devices coupled in a communication network where the encoding format of the sender may not be compatible with the decoding format of the receiver, thereby requiring transcoding between the formats.

29 Claims, 11 Drawing Sheets

MULTIMEDIA INFORMATION RETRIEVAL SYSTEM AND METHOD INCLUDING FORMAT CONVERSION SYSTEM AND METHOD

RELATED UNITED STATES APPLICATION

The instant application claims benefit of provisional patent application Ser. No. 60/151,411, filed on Aug. 27, 1999, entitled "Multimedia Information Retrieval System, Retrieval Method, Multimedia Format Convert System and Method," by Suzuki and Yagasaki.

BACKGROUND OF THE INVENTION

1. Field of the Invention

The present invention relates to the field of multimedia electronic systems More particularly, the present invention relates to methods for encoding and decoding multimedia information and the transmission thereof including systems which display multimedia content that is decoded from encoded bitstreams originating from storage media and/or from an electronic network.

2. Related Art

Audio/visual (AV) material is increasingly stored, transmitted and rendered using digital data. Digital video representation of AV material facilitates its usage with computer controlled electronics and also facilitates high quality image and sound reproduction. Digital AV material is typically compressed ("encoded") in order to reduce the computer resources required to store and transmit the digital data. The systems that transmit multimedia content encode and/or compress the content to use their transmission channel efficiently because the size of the multimedia content, especially video, is very large. Digital AV material can be encoded using a number of well known standards including, for example, the DV (Digital Video) standard, the MPEG (Motion Picture Expert Group) standard, the JPEG standard, the H.261 standard, the H.263 standard and the Motion JPEG standard to name a few. The encoding standards also specify the associated decoding processes as well. The multimedia contents are typically stored on the storage media and are transmitted as bitstreams.

The H.261 and H.263 standards of compression are for audio and visual data. These standards are described by the ITU-T (International Telecommunication Union). The H.261 standard is used for TV conference systems, while the H.263 standard is used for mobile communication. The H.261 and H.263 standards adopt the hybrid coding of Motion Compensation (MC) and Discrete Cosine Transform (DCT). The details of these specifications are described in ITU-T recommendations which are well known.

JPEG is the compression standard used for still images. It is standardized in ISO-IEC/JTC1/SC29/WG1 documents. The JPEG standard uses transform coding (DCT) as is also used in the JPEG standard. The WG1 is now standardizing JPEG2000, which is a more efficient encoding technology for still image processing. The JPEG2000 standard uses wavelet transformation. Motion JPEG is the defacto standard for video processing. In Motion JPEG, each frame of the video is encoded by JPEG. It is used in the Digital Video (DV) standard, which is used in the market today. Interframe correlation is not used for the compression.

MPEG is the compression standard for audio, video and graphics information and includes, for example, MPEG1, 2, 4 and 7. It is standardized in the ISO-IEC/JTC1/SC29/WG11 documents. MPEG1 is the standard for encoding audio and video data for storage on CD-ROM devices (compact disc read only memory). The MPEG1 specification is described in the IS-11393 standard. MPEG2 is the standard for encoding, decoding and transmitting audio/video data for storage media, e.g., DVD (digital video disc), etc., and also for digital broadcasts. MPEG2 supports interlaced video while MPEG1 does not. Therefore, MPEG2 is used for high quality video displaying on TV units. The MPEG2 specification is described in IS-13818. The MPEG4 standard is used for encoding, decoding and transmitting audio, video and computer graphics data. It supports content based bitstream manipulation and representation. The specification is described in IS14496. MPEG7 is the standard of the meta information of multimedia (MM) contents. The example of. the meta data is data is describes or is related to the MM contents, such as, identification and/or other descriptions of the author, producer information, directors, actors, etc. The MPEG7 standard is currently under standardization, and is in draft form but available. The draft specifications are described in the ISO-IEC-JTC1/SC29/WG11 documents.

In the past, existing multimedia systems have been closed applications. One example of an existing closed multimedia information retrieval system is the DVD system. The audio/visual contents are encoded by MPEG2 and stored on a DVD storage media ("disc"). The DVD player reads the bitstream from the DVD disc and decodes its bitstream and then displays the decoded contents on the associated TV set. The DVD player is "closed," because the decoder circuit within the DVD unit only needs to be configured with one decoding technique because all contents of the DVD disc are always encoded using a single compression technique. For example, the DVD player is only required to decode the bitstreams that are encoded using DVD. A set-top-box (STB) is also only required to decode the bitstreams from a group of broadcasters that use a predefined encoding technique that is developed specifically to be decoded by the STB. For example, if an STB received information that it could not decode (e.g., it was encoded using a different compression technique), the STB might crash during the decoding process. Therefore, in closed applications, all bitstreams are encoded to guarantee to decode on a known client system with a known decoding format.

However, recently, many companies produce many different types of digital multimedia systems using different compression techniques. So far, digital AV multimedia systems have only been used for professional productions. The progress of LSI and signal processing technologies has recently reduced the cost of the digital systems and, as a result, AV multimedia systems are being used in consumer products. Examples of such digital consumer products include Video CD, DVD, DV (Digital Video), Digital Still Cameras, etc.

Digital computer technology and digital network technology has also progressed in the last 10 years. Computers are connected to each other by digital communication networks and can share the resources and information of the network. The Internet became very popular and is now an indispensable tool for many business and home users. Users can access various kinds of information and services through the Internet. In the case of businesses, the Intranet is very popular. With respect to an Intranet, all the computers in the office are connected to each other and their users can share information and resources that are in the same office. These network technologies not only allow access to information or resources, but also allow the distribution of computing power to several terminals in the network. The distributed system is very useful for terminals having limited computational power because it is possible to reduce the computational power required to execute some applications.

Network technologies have also been introduced to the field of consumer electronics. The standardization of a high-speed network, such as the serial communication standard, IEEE 1394, has been very successful with many companies developing products for this communication standard. In view of the expansive use of the Internet, the Intranet and in view of the growing use of consumer electronics being connected together via the IEEE 1394 communication standard, many digital systems can now receive information from various different digital systems. When the server receives a request for digital information, it sends the information in the form of a digital bitstream. This causes a problem, however, in that the encoding format used by the sender (server) may not match the decoding format used by the receiver (client). In this case, the client may not be able to decode the requested multimedia content sent by the sender. What is needed is an efficient system that allows networked digital systems to receive and decode encoded bitstream information that was sent from various different digital systems.

SUMMARY OF THE INVENTION

Accordingly, the present invention provides a method and system for allowing networked digital systems to receive and decode encoded bitstream information that was sent from various different digital systems. The present invention includes a format converter that is able to automatically convert (transcode) encoded bitstream information from one format to another so that the client (receiver) is able to display the received information. The format converter of the present invention also automatically allocates the computer resources that are necessary for converting to the appropriate format.

A multimedia information retrieval system and method are described including a method and system for automatic format conversion. The invention includes a data structure ("contents information") that is associated with each requested multimedia bitstream. The data structure identifies the encoding format, e.g., compression technique, used in the encoded multimedia bitstream which can be originated by a contents server. An automatic format conversion process then queries information from the client system (requester) and also receives the data structure identifying the encoding format. The client information identifies the decoding format compatible with the client.

The automatic format conversion then determines the transcoding process required for converting the bitstream from its encoded format to the format recognized by the client system. The format conversion process of the present invention also determines whether or not decoding is required before transcoding is performed thereby saving processing time and computer resources in those cases where decoding is not required. Moreover, the format conversion process also automatically determines the computer memory size required (frame memory) to perform the transcoding process thereby efficiently using computer memory resources. The format converter can be implemented in software as an application and can also be integrated within a data access server. The data access server can be integrated within the client system or within the contents server. The format converter of the invention is particularly useful for electronic devices coupled in a communication network where the encoding format of the sender may not be compatible with the decoding format of the receiver, thereby requiring transcoding between the formats.

One embodiment of the present invention includes a method for processing multimedia information comprising the steps of: a) responsive to a request signal from a client, accessing a portion of encoded multimedia information from a database storing encoded multimedia information; b) accessing contents information describing an encoding format of the portion of encoded multimedia information and accessing client information describing a decoding format of the client; and c) automatically transcoding the portion of encoded multimedia information to generate transcoded multimedia information based on the contents and client information, wherein the transcoded multimedia information is compatible with the decoding format of the client. Embodiments include the above and wherein step c) comprises the steps of: c1) based on the contents and client information, automatically determining whether or not decoding is required of the portion of encoded multimedia information; c2) provided decoding is required, automatically determining memory resources required to decode the portion of encoded multimedia information; c3) provided decoding is required, decoding the portion of encoded multimedia information to produce decoded multimedia information; and c4) based on the contents and client information, transcoding the decoded multimedia information to provide the transcoded multimedia information.

DETAILED DESCRIPTION OF THE INVENTION

Figure 1:
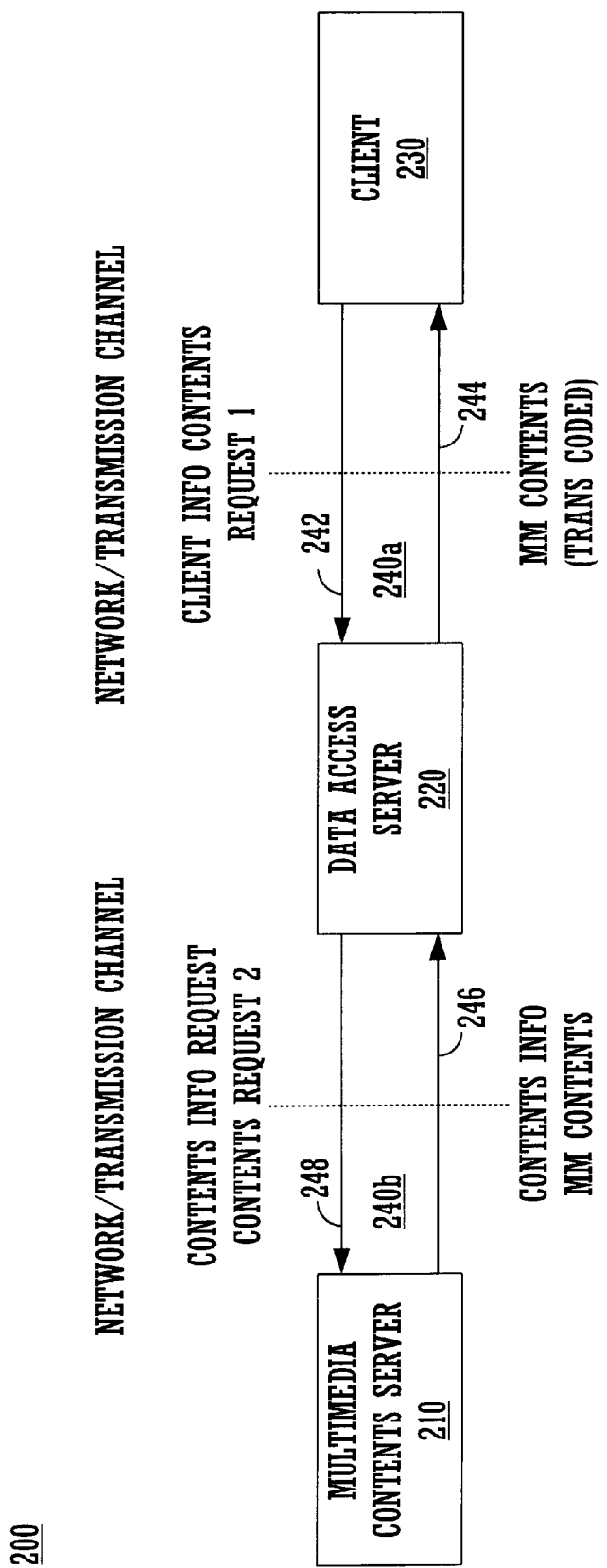
FIG. 1 is a block diagram of a multimedia contents access system of one embodiment of the present invention.

In the following detailed description of the present invention, a multimedia information retrieval system and method including a method and system for automatic format conversion, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Embodiments of the present invention are related to an audiovisual encoder, encoding method, decoder, decoding method, transcoder, transcoding method and information retrieval system (including storage system and storage method). More specifically, the present invention is related to digital systems which display multimedia contents that are decoded from encoded bitstreams that can originate from storage media and/or from network communication systems. Examples of these systems include TV conference systems, TV phone systems, broadcast systems, and multimedia database systems. The terminal (also called client system) accesses to the multimedia contents from the network and/or from the storage media, and displays the decoded contents and/or edits the information. The invention includes a transcoding device that is situated, for example, within a data access manager to facilitate automatic format conversion between a contents server and a client system.

NOTATION AND NOMENCLATURE

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

MULTIMEDIA CONTENTS ACCESS SYSTEM

FIG. 1 illustrates an embodiment of the multimedia contents access system 200 of the present invention. System 200 contains a multimedia contents server ("server") 210 which is the sender of multimedia (MM) information in the form of a digital bitstream. A client system or ("client") 230 is the recipient of the bitstream and also requests the bitstream from the multimedia contents server 210. The client 230 can be any electronic device, including, for example, a set-top-box, a CD, a DVD, a computer system, a TV unit, a VCR, etc. Between the client 230 and the server 210 is located a data access server 220 of the present invention. The data access server 220 can also be integrated within the client 230 or, alternatively, it can be integrated within the server 210. The data access server 220 is linked to the server 210 via communication channel (network or transmission channel) 240b and is linked to the client 230 via communication channel (network or transmission channel) 240a. A number of well known digital communication networks and/or standards can be used to realize channels 240a and 240b in accordance with the present invention. In one embodiment, the communication channel can be the Internet. In another embodiment, the communication channel can be the IEEE 1394 serial communication standard.

Client information and contents requests 242 are communicated from the client 230 to the data access server 220. MM contents (e.g., bitstreams) 244 are communicated from the data access server 220 to the client 230. The MM contents 244 are transcoded contents. Contents information requests and contents requests 248 are communicated from the data access server 220 to the server 210 and are initiated in response to requests from the client 230. Contents information and MM contents 246 are communicated from the server 210 to the data access server 220. MM contents 246 are encoded bitstreams. A function of the data access server 220 of the present invention is to transcode the encoded bitstreams 246 so that the transcoded version 244 is format compatible with the client 230.

The multimedia contents are stored on the multimedia contents server 210. The contents are stored as a row data, or bitstreams and can be formatted under any number of the well known formatting standards such as, for example, MPEG, JPEG, H.263, H.261, Motion JPEG, Video CD, DVD, DV (Digital Video), Digital Still Camera, etc. The client 230 is the terminal of the multimedia contents access system 200. The user accesses the contents from this client 230. Client 230 sends the Contents Request 1 signal 242, which is a request for certain contents, e.g., a particular image or audio program or title. Another example of the Contents Request 1 signal is the title of a motion picture. In one embodiment, the Contents Request 1 signal is semantic information concerning the contents, which is described in, for example, the MPEG7 standard. The client 230 also forwards a Client Information signal 242 which is information describing the client system, including client resources, such as memory size, display size, computational power, buffer size and the decoding format that is supported by (e.g., compatible with) the client 230.

Data access server 220 of FIG. 1 receives the Contents Request 1 signal and Client Information signal 242 from Client 230. Data access server 220 sends a Contents Information Request signal 248, which is a request for contents information about the requested multimedia bitstream, to server 210. Data access server 220 also sends a Contents Request 2 signal 248, which is the request of the MM contents (bitstream), to server 210. Server 210 stores both the multimedia contents, e.g., in bitstream form, and also a database of information describing those contents, e.g., titles, information about directors, producers, authors, actors, etc., which is called "contents information." Server 210 receives the Contents Information Request signal and sends back the Contents Information 246 signal to the data access server 220. The Contents Information signal includes information that describes the MM contents that are stored on the server 210. An example of the Contents Information signal is the file name. The Contents Information signal might be both semantic and syntactic information of the contents, such as a file name, a pointer to the appropriate place in the bitstream, etc., which is described in the MEPG7 standard. The Contents Information also includes various information (as shown in Table I, Table II and Table III) regarding the encoding format used by its associated MM Contents.

The data access server 220 receives the Contents Request 1 signal and finds the appropriate contents in an appropriate format on the server 210. Data access server 220 then sends the Contents Request 2 signal 248, which requests the appropriate MM contents (bitstream) from the server 210. The example of the Contents Request 2 signal is the file name. The Content Request 2 signal is a syntactic information of the content, such as a file name, a pointer to the appropriate place in the bitstream, etc., which is described in MPEG7.

Server 210 sends the requested MM Contents 246 to the data access server 220. Data access server 220 receives the Contents Information signal and the MM Contents from the server 210. Data access server 220 converts (transcodes) the MM Contents to the appropriate format for the client 230 using the Client Information signal and Contents Information signal. Data access server 220 then sends converted (transcoded) MM Contents 244 to the Client 230.

In FIG. 1, the data access server 220, which handles the format conversion of the MM contents, is independent from both the server 210 and client 230. However, it is possible to implement the modules in the data access server 220 in the server 210 or in the client 230.

Figure 2:
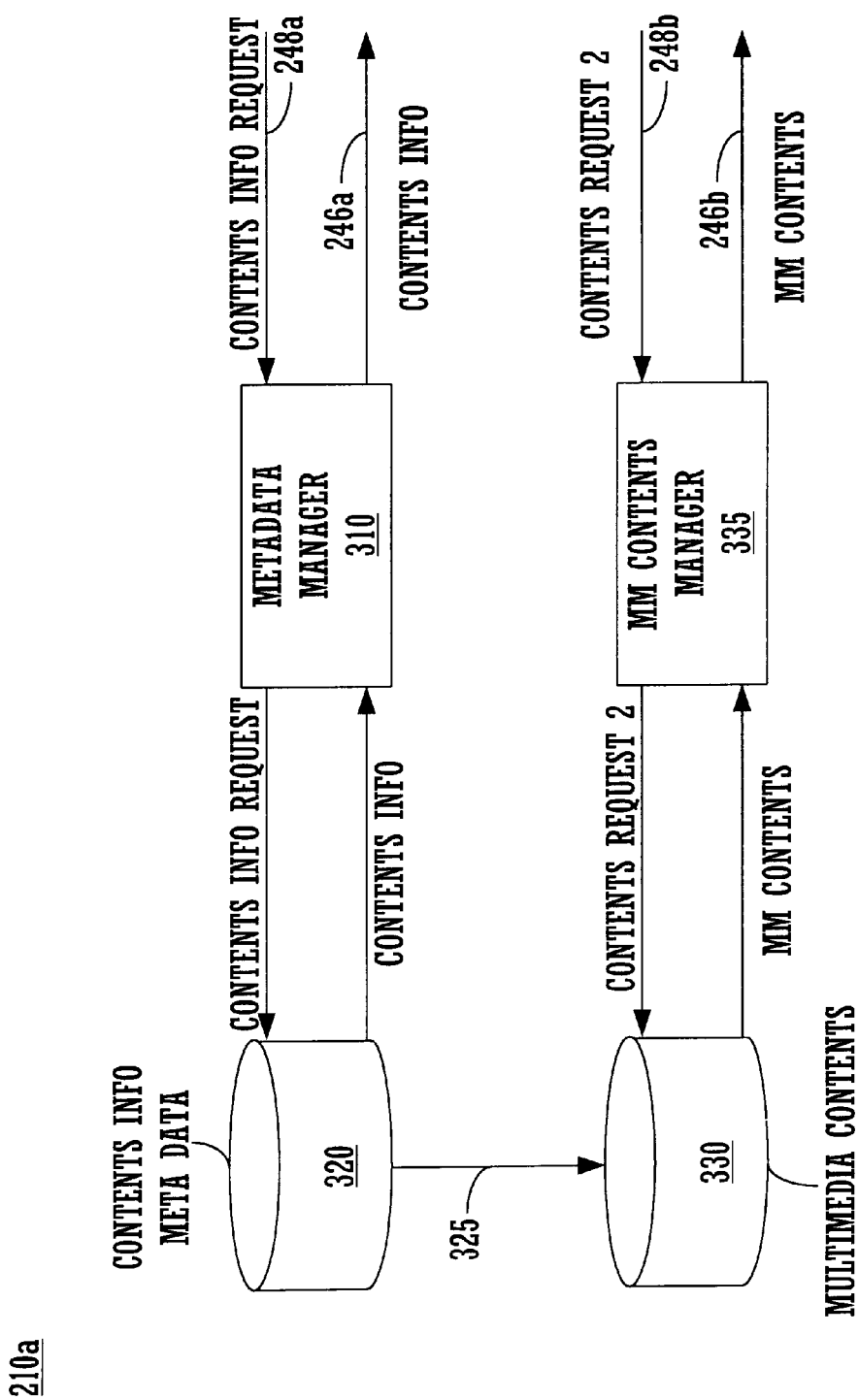
FIG. 2 illustrates an embodiment of the multimedia contents server of the present invention.

FIG. 2 illustrates an embodiment 210a of the multimedia contents server 210 of FIG. 1. Contents Information and other meta data ("metadata") are stored on the metadata storage unit 320. Multimedia contents are stored on the multimedia contents storage unit 330. Storage units 320 and 330 can be realized using any suitable digital storage medium such as digital memory arrays or a hard disk drive (optical or magnetic), etc. Content Information is metadata that includes both syntactic and semantic information of the associated MM contents as well as other information described in Tables I-III. An example of the semantic information is the title or director of a movie while the encoded bitstream that constitutes the movie is the MM Contents. An example of the syntactic information is the file name, URL locator, and the appropriate location in the bitstream. An example of the Contents Information is the metadata that is described in the MEPG7 standard. As described further below, Contents Information also includes specific information used for determining the encoding technique employed for the MM Contents.

The MM Contents, e.g., the digital bitstream data, are stored on the multimedia contents storage unit 330 of FIG. 2 in various types of well known formats, e.g., MPEG, H.261, H.263, Motion JPEG, DV, DVD, CD, etc.

The multimedia contents server 210a of FIG. 2 also includes a metadata manager 310 and an MM contents manager 325. The Contents Information Request signal 248a is received from the data access server 220 and is input to the metadata manager 310 which handles the contents information stored on the metadata storage unit 320. Metadata manager 310 sends a Contents Information Request signal to the metadata storage unit 320 to query the storage unit 320 for the designated Contents Information as requested by the client 230. Metadata storage unit 320 sends the appropriate Contents Information to the metadata manager 310. Then, metadata manager 310 sends the Contents Information signal 246a to the data access server 220. Link 325 is used to correlate the metadata contents of storage unit 320 with its corresponding bitstream information of storage unit 330 and for synchronizing the transmission of this information, as appropriate.

The Contents Request 2 signal 248b is received from the data access server 220 and is input to the multimedia contents manager 335 which handles the multimedia contents on the multimedia contents storage 330. Multimedia contents manager 335 sends the Contents Request 2 signal to the multimedia contents storage 330 to identify a particular bitstream for transmission. Multimedia contents storage 330 sends the appropriate encoded MM Contents to the multimedia contents manager 335. Then multimedia contents manager 335 sends the designated MM Contents 246b to the data access server 220. MM contents 246b from MM contents manager 335 are in the encoded form.

Figure 3:
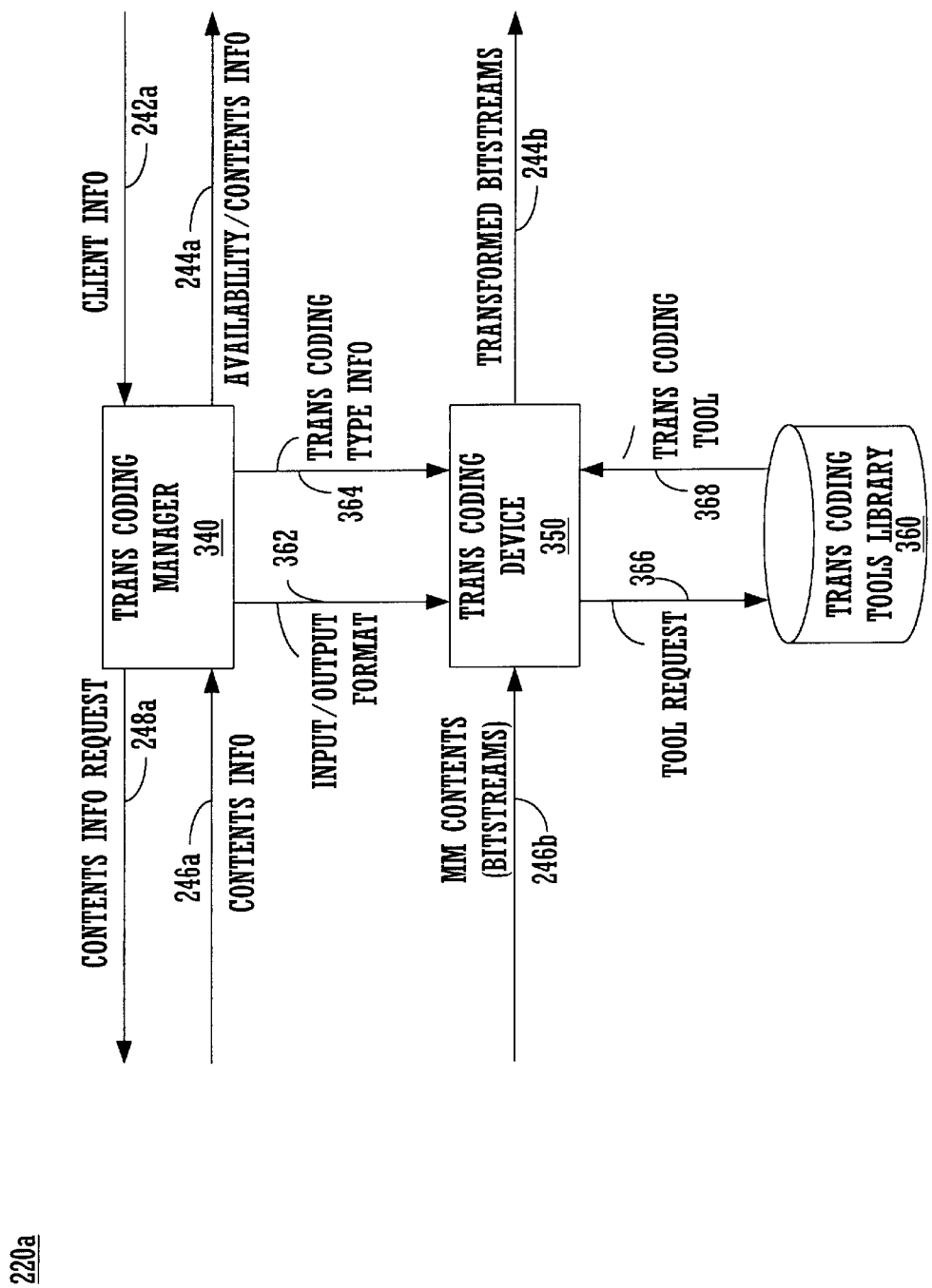
FIG. 3 illustrates an embodiment of the data access server of the present invention including the transcoding device and transcoding device manager.

FIG. 3 shows an embodiment 220a of the data access server 220 of the present invention. Server 220a consists of a transcoding manager 340, a transcoding device (or process) 350 and a transcoding tools library 360. The Client Information signal 242a which is received from the client 230 is input to transcoding manager 340 and informs the transcoding manager 340 of the decoding standard supported by the client 230 (the output format). Contents Information signal 246a that is received from the multimedia contents server 210a is input to the transcoding manager 340 and contains information regarding the encoding standard used by the associated MM Contents 246b (the input format). From this, the transcoding manager 340 generates an input/output format signal 362 informing the transcoding device of the pertinent input and output formats.

The transcoding manager 340 of the present invention decides the output format of the MM Contents using the Client Information signal 242a and determines the input format of the MM Contents using the Contents Information 246a of the present invention. The transcoding manager 340 decides the manner in which to convert the input MM Contents 246b into Transformed Bitstreams 244b. The transcoding manager 340 sends the TransCoding Type Information signal 364 to the transcoding device 350. The TransCoding Type Information signal 364 specifies the output format of the MM contents and the transcoding process to employ to generate the Transformed Bitstreams 244b. The process utilized to decide the TransCoding Type Information signal 364 is described further below.

The transcoding manager 340 of FIG. 3 also sends the Availability and Contents Information signal 244a to the Client 230 (FIG. 1). The transcoding manager 340 sets the Availability signal 244a t0 '0, ' if there are no contents on the multimedia contents server 210a or if there are no contents that meet the specified client request. The transcoding manager 340 sets the Availability signal 244a to '1, ' if there are contents on the multimedia contents server 210a.

The transcoding device 350 converts the format of the MM Contents 246b, based on the TransCoding Type Information signal 364, to generate the Transformed Bitstreams 244b which are forwarded to the client 230.

Figure 4A:
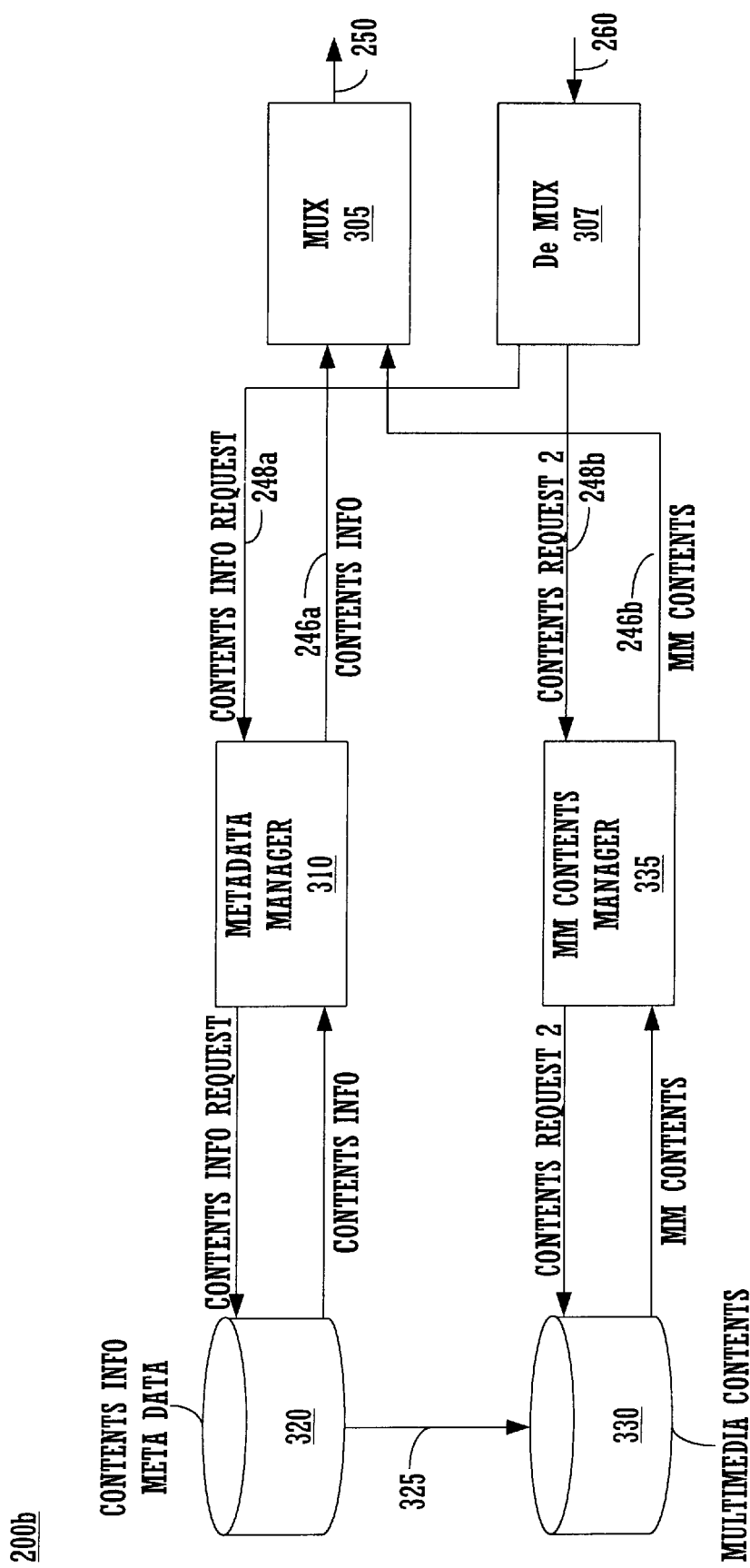
FIG. 4A illustrates an embodiment of the multimedia contents server of the present invention that utilizes multiplexed transmission.

FIG. 4A illustrates an embodiment 210b of the multimedia contents server 210 of FIG. 1. Embodiment 210b is similar to embodiment 210a (FIG. 2) except for multiplexer 305 and demultiplexer 307. Multiplexer 305 multiplexes the Contents Information signal 246a with the MM Contents bitstream 246b onto a single communication channel shown as 250. In this case, a single communication channel can be used for communicating information from the multimedia contents server 200b to the data access server 220. On the other hand, demultiplexer 307 functions to demultiplex both the Contents Request 2 signal 248b and the Contents Information Request signal 248a from the single communication channel 260. In this case, a single communication channel can be used for communicating information from the data access server 220 to the multimedia contents server 200b.

Figure 4B:
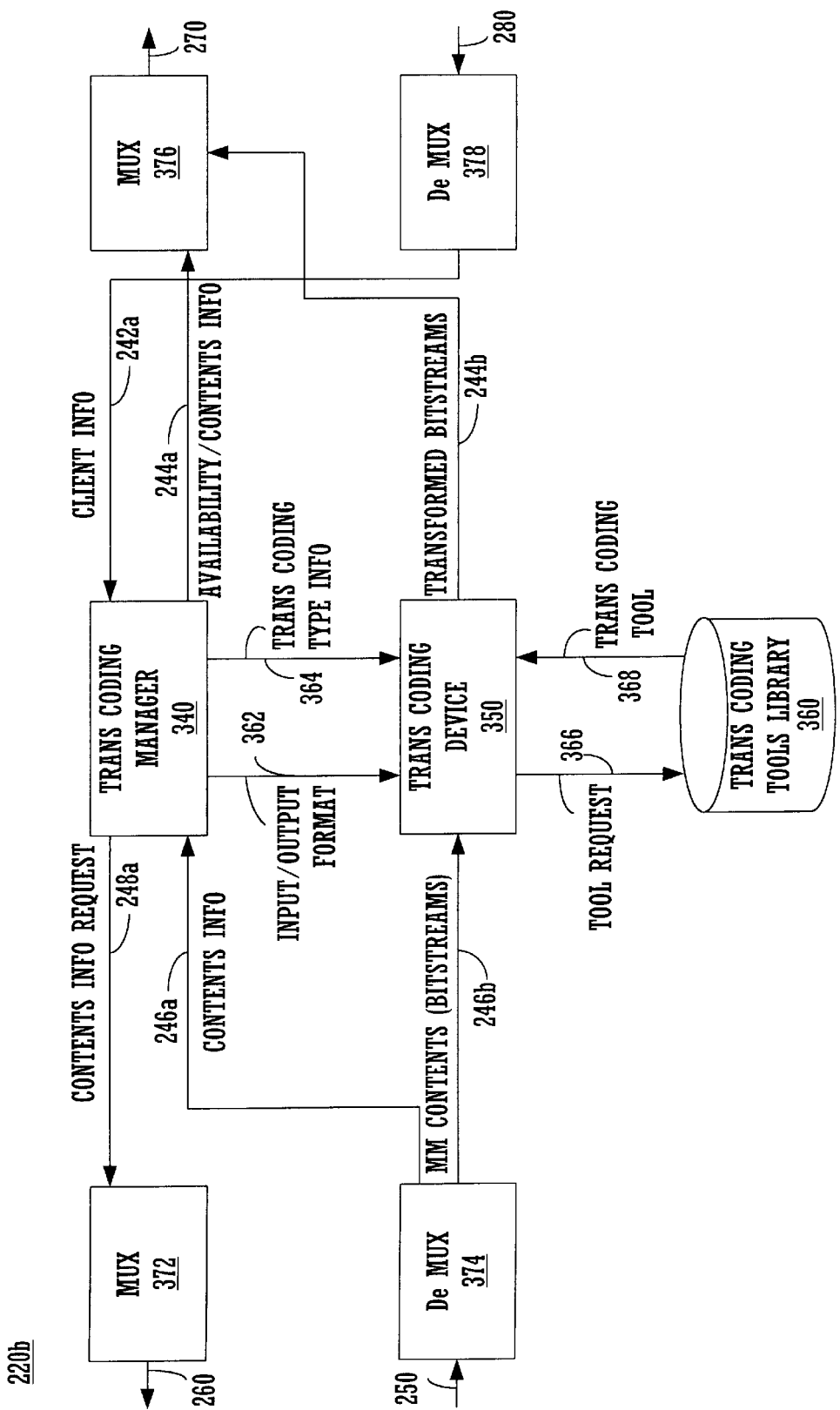
FIG. 4B illustrates an embodiments of the data access server of the present. invention that utilizes multiplexed transmission including the transcoding device and transcoding device manager.

FIG. 4B illustrates an embodiment 220b of the data access server 220 of FIG. 1. Embodiment 220b is similar to embodiment 220a (FIG. 2) except for multiplexers 372 and 376 and demultiplexers 374 and 378. Multiplexer 372 multiplexes the Contents Information Request signal 248a and the Contents Request 2 signal 248b (not shown in FIG. 4B) onto a single communication channel 260. Demultiplexer 374 demultiplexes the Contents Information signal 246a and the MM Contents signal 246b from the single communication channel 250. Moreover, multiplexer 376 multiplexes the Availability and Contents Information signal 244a and the Transformed Bitstreams signal 244b onto a single communication channel 270. In this case, a single communication channel 270 can be used for communicating information from the data access server 220b to the client system 230 (FIG. 1). Demultiplexer 378 demultiplexes information from the communication channel 280 (coupled to the client system 230) to produce the Client Information signal 242a. In this case, a single communication channel 280 can be used for communicating information from the client system 230 (FIG. 1) to the data access server 220b.

Figure 5:
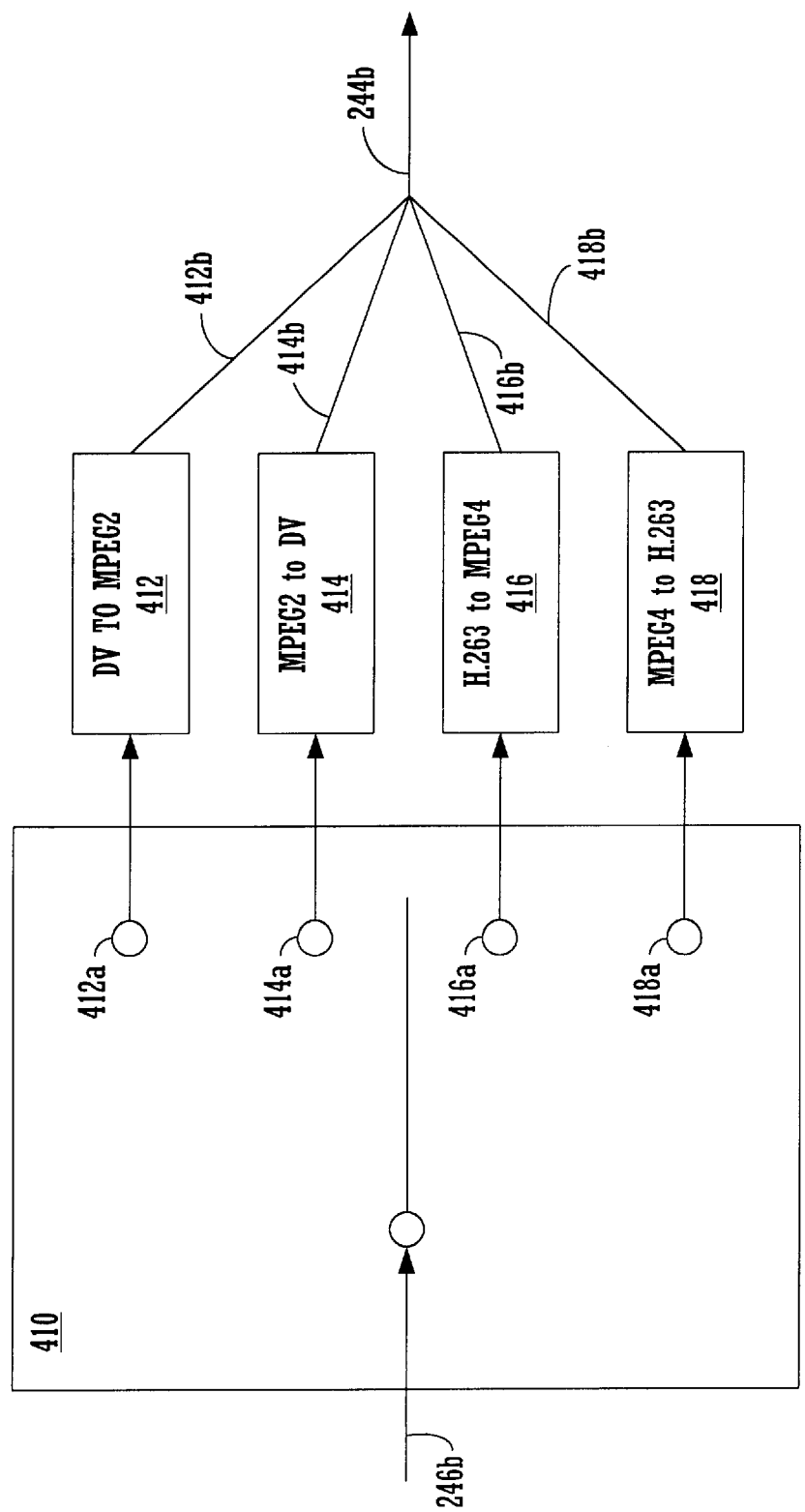
FIG. 5 illustrates one embodiment of the transcoding device in accordance with the present invention.

FIG. 5 illustrates one embodiment of the transcoding device 350. In FIG. 5, all combinations of transcoding tools, for example, 412–418 are implemented in transcoding device 350. In this embodiment, the transcoding device 350 functions as a switch 410 to select one of the tools 412–418 to perform the proper transcoding function based on the TransCoding Type Information signal. Tools 412–418 are programmed to perform predefined conversion processes and can be implemented using hardware typically, but software can also be used. The switch 410 functions to provide the input MM Contents signal 246b to one of the inputs 412a–418a. Only the selected tool of the transcoding tools 412–418 is active at any time, therefore, their outputs 412b–418b can be connected to provide a single transcoded output 244b. For example, if the input bitstream 246b is in MPEG2 format and output bitstream format is to be in DV format, then the input MEPG2 bitstream is input to the "MEPG2 to DV" converter module 414. The "MEPG2 to DV" converter module then transcodes the bitstream into DV format and outputs this transcoded bitstream 244b to the Client 230 of FIG. 1. It is appreciated that each tool 412–418 also performs any required decoding as is necessary to perform the transcoding process. Not all transcoding processes require decoding, for instance, the DV to MEPG2 tool does not typically require decoding of the input bitstream stream to perform transcoding.

FIG. 3 and FIG. 4B illustrate more general embodiments of the transcoding device 350 which are implemented using software tools rather than predefined combinations as shown in FIG. 5. In these embodiments, the transcoding device 350 is in general a software module executing on a processor of a computer system (112 of FIG. 10) or on a digital signal processor (DSP). In this embodiment, the transcoding device 350 uses the appropriate transcoding tools which are stored in a transcoding tool library 360 which is implemented in computer readable memory units of the computer system 112. All expected format combinations can be made using the transcoding tool library 360. Based on information from the TransCoding Type Information signal 364, the transcoding device 350 sends a Tools Request signal 366 indicating the software tools required to perform the appropriate transformation between the MM contents 246b and the Transformed Bitstreams 244b (which is based on the TransCoding Type Information 364).

A different software tool is used for each different combination of input/output format that can be expected to be involved in the transcoding process performed by transcoding device 350. Transcoding tool library 360 then sends back the selected Trans Coding Tool 368, which are software modules, to the transcoding device 350. Transcoding device 350 then allocates the appropriate resources, such as the size of the memories, etc., within system 112 (FIG. 10) to support the selected Trans Coding Tools 368. It is appreciated that the TransCoding Type Information 364, from the transcoding manager 340, indicates whether or not decoding of the MM Contents 246b is required before transcoding is performed. Once programmed with the appropriate transcoding tool, configured with the appropriate memory resources and configured to perform decoding or not, the transcoding device 350 then performs a transcoding process to generate the Transformed Bitstream 244b.

Tables I, II and III below illustrate an example of the Contents Information signal 246a that is associated with each MM Contents 246b bitstream. It is appreciated that the Contents Information described below represents statistics about the encoded bitstream (MM contents 246b) that otherwise would not be apparent from the bitstream 246b without first decoding the bitstream 246b in its entirety. By providing this information by way of the Contents Information 246a, the present invention allows a very efficient transcoding process to be achieved that may not always require decoding of the MM Contents 246b before transcoding is performed.

TABLE I

ApplicationDescriptor {
    int ApplicationID;
    int SizeofServiceInfo;
}

TABLE II

VariableBitRateInfo {
    int MaxBitRate;
    int AverageBitRate;
}

TABLE III

VisualBitstreamParameter_Descriptor {
    bool isI_Picture;
    bool isP_Picture;
    bool isB_Picture;
    bool isFrameStruct;
    bool isFieldStruct;
    bool isFrameMC;
    bool isFieldMC;
    bool isSpecialMC;
    bool isFrameDCT;
    bool isFieldDCT;
}

In accordance with the present invention, the data access server 220 is used to perform automatic format conversion so that a contents server can send information to a client without requiring that the data stored on the contents server be compatible with the decoding technique supported by the client. In order for the present invention to perform the automatic format conversion, the sending application identifies the encoding format used in its bitstreams.

Table I shows the descriptor used to identify the application which was used to encode the MM Contents bitstream 246b. The Application Descriptor of the present invention contains an identifier of the application and specifies the application that encoded the bitstreams. The decoder can identify if it is decodable or not, using this information. Table I shows an example of the Application Descriptor including an ApplicationiD field and a SizeofServiceinfo field. The ApplicationID is the flag used to identify the encoding application, e.g., DV, MPEG2, DVD, etc. The SizeofServiceinfo is the flag used to specify the maximum size (in bytes) of the service information. found in the user data. It is typically multiplexed in the bitstream and is used for buffer management. For instance, if the user data is large, the decoder might crash. Therefore, the decoder can check the maximum size of the user data using this field.

Table II shows an example of the VariableRateInfo Descriptor of the present invention which includes the MaxBitRate field and the AverageBitRate field. In the case of MM Contents that use variable bitrate coding, the decoder can only know that the bitstream is encoded by variable bitrate rate control from an inspection of the information in the bitstream. The decoder can know the maximum, minimum, and average bitrates of the bitstream using this descriptor.

Table III shows an example of the BitstreamParameterDescriptor of the present invention. The BitstreamParameterDescriptor is the descriptor which specifies the encoding parameter which is not otherwise described in the bitstream itself. In the bitstream, only the information needed to decode the bitstream is described. However, that information (of the bitstream) alone might not be enough to identify how the bitstream should be transcoded efficiently. For this reason, the present invention provides a specific encoding parameter to allow efficient transcoding. For example, if all pictures of the bitstream are encoded as Intra type in MEPG2 format, then it is possible to access all frames independently. In this case, it is possible to transcode the bitstream to the DV format without decoding DCT coefficients. However, without the BitstreamParameterDescriptor of the present invention, it would not be possible to identify whether all pictures are encoded as Intra type or not without first decoding the entire bitstream.

The isI_Picture field is a one bit flag that specifies whether I pictures exist in the bitstream. If I pictures exist in the bitstream, then this flag is set to '1' (true) and is set to "0" (false) otherwise. The isP_Picture field is a one bit flag which specifies whether P pictures exist in the bitstream. If P pictures exist in the bitstream, this flag is set to '1' (true) and is set to "0" (false) otherwise. The isB_Picture field is a one bit flag which specifies whether B pictures exist in the bitstream. If B pictures exist in the bitstream, this flag is set to '1' (true) and is set to "0" (false) otherwise. If all bitstreams are encoded by Intra picture only, then the isI_Picture field is equal to '1, ' the isP_Picture field is equal to '0' and the isB_Picture field is equal to '0.'

The isFrameStruct field is a one bit flag that specifies whether frame structures exist in the bitstream. If at least one frame structure picture exists, this flag is set to '1' (true) and is set to '0' (false) otherwise. The isField_struct field is a one bit flag used to specify whether field structures exist in the bitstream. If at. least one field structure picture exists, this flag is set to '1' (true) and is set to '0' (false) otherwise.

The isFrameMC is a one bit flag used to specify whether frame motion compensation (MC) is used in the bitstream. If at least one frame MC is used, this flag is set to '1' (true) and is set to '0' (false) otherwise. The isField_MC field is a one bit flag to specify whether field structures exist in the bitstream. If at least one field MC is used, this flag is set to '1' (true) and is set to '0' (false) otherwise. The isSpecial_MC field is a one bit flag to specify whether another kind of MC, such as dual prime or etc., is used in the bitstream. If at least one Special MC is used, this flag is set to '1' (true) and is set to '0' (false) otherwise.

The isFrameDCT field is a one bit flag to specify whether frame discrete cosine transform (DCT) are used in the bitstream. If at least one frame DCT is used, this flag is set to '1' (true) and is set to '0' (false) otherwise. The isField_DCT field is a one bit flag to specify whether field structures exist in the bitstream. If at least one field DCT is used, this flag is set to '1' (true) and is set to '0' (false) otherwise.

AUTOMATIC FORMAT CONVERSION PROCESS OF THE DATA ACCESS SERVER OF THE PRESENT INVENTION

Figure 6:
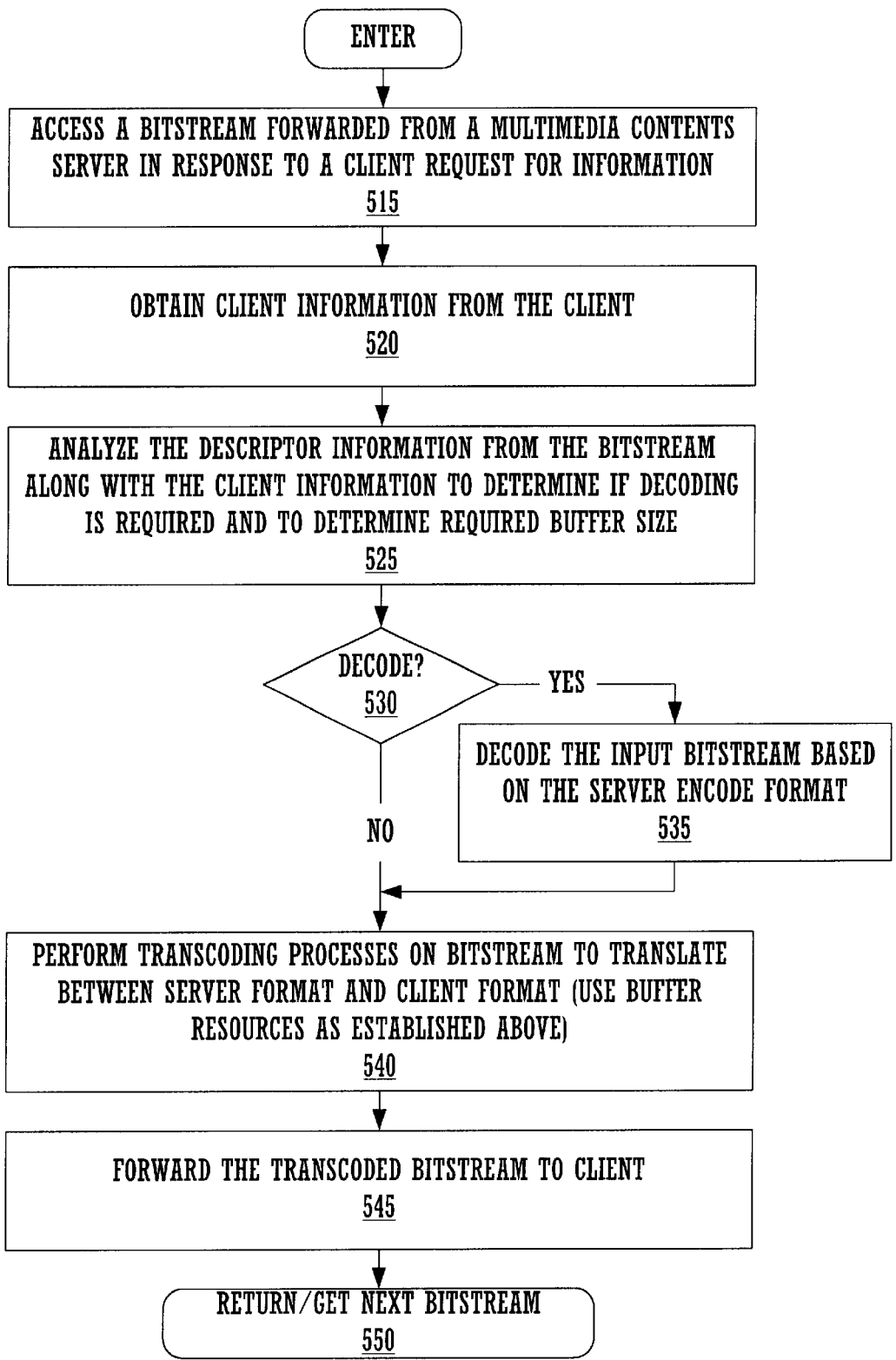
FIG. 6 is a flow diagram illustrating steps performed by the data access manager of the present invention for performing transcoding on an input bitstream of multimedia information.

FIG. 6 illustrates a flow diagram 510 of steps performed by the transcoding manager 340 and the transcoding device 350 pertinent for the embodiments that implement the transcoding processes in software. The steps 510 are implemented, in one embodiment, as instructions stored in computer readable memory units of system 112 (FIG. 10) and executed by processor 101. At step 515, the data access server 220 accesses an encoded bitstream (e.g. MM Contents 246b) forwarded from, the multimedia contents server 210 in response to a client request for multimedia information. At step 515, certain descriptors within a Contents Information signal are also received as described in Tables I, II and III. At step 520, the data access server 220 obtains certain Client Information from the client system 230 specifying the decoding formats supported by the client system 230.

At step 525, the data access server 220 analyzes the descriptor information of the Contents Information along with the Client Information to determine: (1) if decoding is required of the MM Contents before transcoding; and (2) the required buffer memory size to perform transcoding. This information is supplied in the form of a TransCoding Type Information signal to a transcoding device 350. At step 530, if decoding is indicated by the determination performed at step 525, then the MM Contents are decoded at step 535 using the encoding process specified in the Contents Information, otherwise step 540 is entered without decoding. If decoding is performed, then step 535 generates a decoded version of the MM Contents.

At step 540, the transcoding device 350 requests and receives appropriate transcoding tools from a transcoding tool library 360 and performs a transcoding process of the MM Contents into a Transcoded Bitstream. If decoding is not required, then the MM contents 246b can be directly transcoded into the Transcoded Bitstream at step 540, otherwise the transcoding processes 540 operate on the decoded version of the MM Contents. Any of a number of well known transcoding processes can be used at step 540 to perform the transcoding process. At step 545, the data access server 220 then forwards the Transcoded Bitstream to the client system 230 for display or other rendering. At step 550, the process 510 is repeated for a next bitstream.

Figure 7:
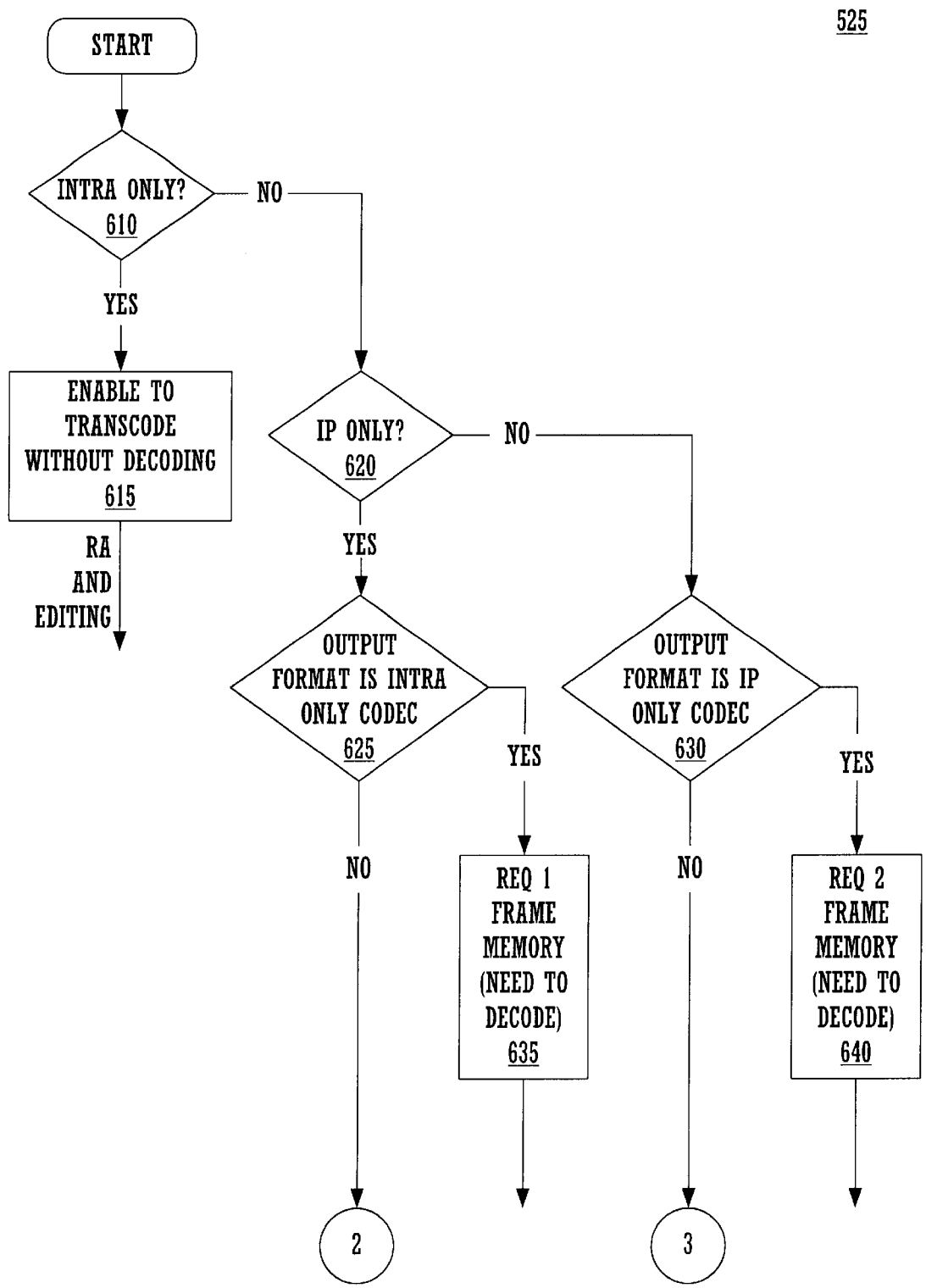
FIG. 7, FIG. 8 and FIG. 9 illustrate steps performed by an embodiment of the data access server of the present invention for determining whether or not decoding is required for a particular transcoding process and also for determining the amount of memory resources required for the transcoding process.
Figure 8:
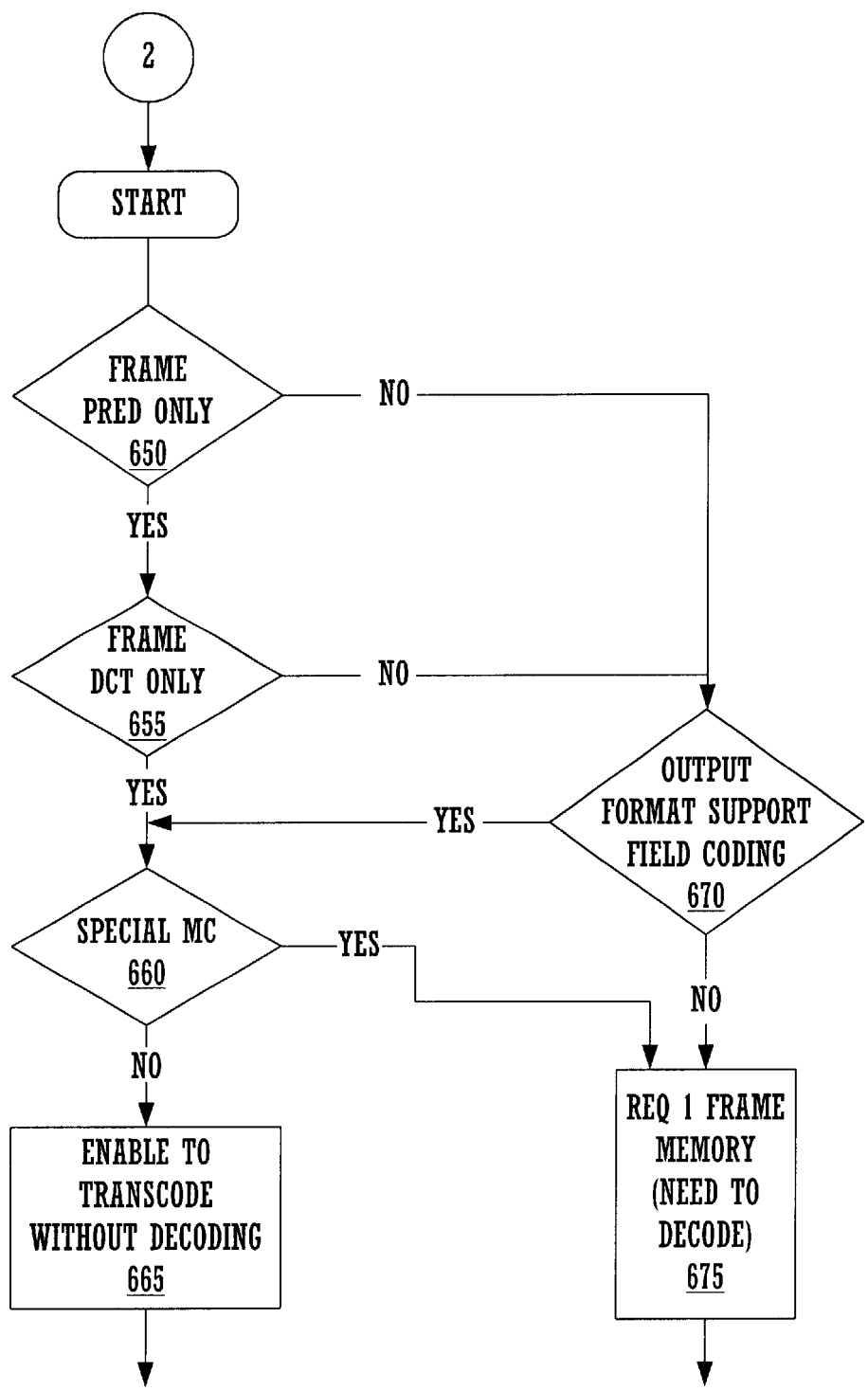
Figure 9:
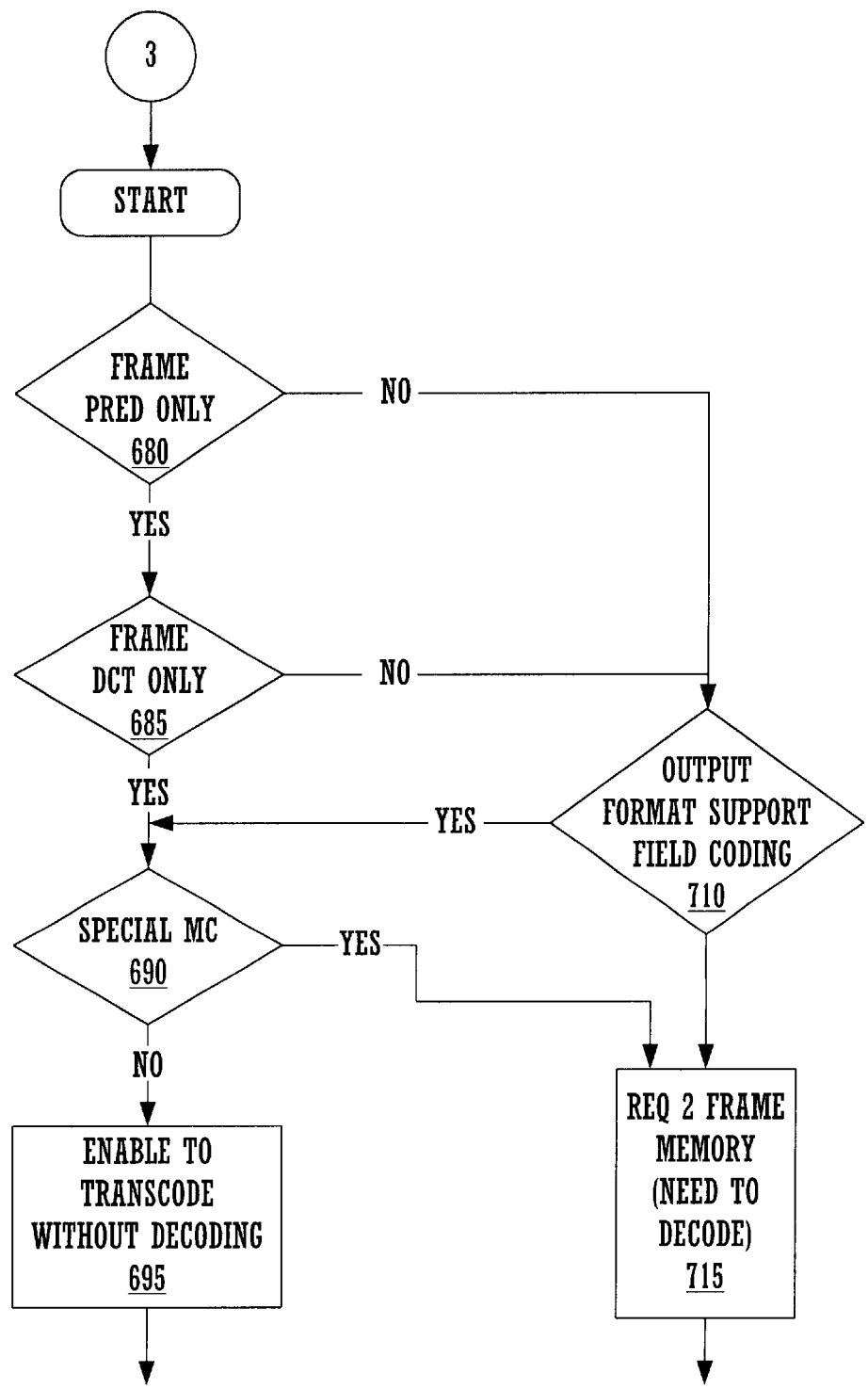

The process 525 of FIG. 6 is described in more detail with respect to FIG. 7, FIG. 8 and FIG. 9.

FIG. 7 shows an example process for deciding the TransCoding Type Information signal using the VisualBitstreamParameterDescriptor of Table III. At step 610, if isI_Picture is equal to 1 and isP_Picture and isB_Picture are both 0, then all frames in the bitstream are encoded as Intra picture type. Therefore, it is possible access to all frames of the MM Contents without decoding other extra frames (e.g., Random Access), and it is possible to edit, e.g., cut and paste, at any frame in the bitstream. It is further possible to transcode the bitstream into other formats, which use DOT transform coding, without decoding the DCT coefficients of the MM Contents and therefore no frame memories are necessary for the transcoding process. Step 615 is therefore entered and a flag is set to indicate that no decoding is required and no frame buffer resources are required. The application can use this information to identify whether this bitstream can be edited and can be accessed at any frame or not. After step 615, process 525 terminates.

In the case of FIG. 3, transcoding manager 340 sends TransCoding Type Information signal 364 as "Enable Transcoding without Decoding" to transcoding device 350. When transcoding device 350 receives this, it does not allocate any frame memory space for the transcoding process.

With respect to FIG. 8, at step 620, if isI_Picture is equal to 1 and isP_Picture is equal to 1 and isB_Picture is equal to 0, then there are no B Pictures in the MM Contents but at least one P Picture is Used in the bitstream. Step 625 is entered. In this case, Inter frame prediction is used to encode this bitstream. If the output format (as specified by the Client Information) also supports the inter frame coding, then step 650 (FIG. 8) is entered and it may be possible to transcode the MM Contents without decoding its DCT coefficients. However, if the output format does not support the inter-frame coding, such as the DV format or JPEG or MEPG2 or MPEG4, then the DCT coefficients of the MM Contents need to be decoded and step 635 is entered and a flag is set requiring decoding and also allocating one frame of buffer memory. At step 635, the output format does not support the inter frame coding and the transcoding device 350 needs-to decode the DCT coefficients from the MM Contents. In this case, at least one frame memory is necessary to perform the transcode. In the case of FIG. 3, transcoding manager 340 sends the TransCoding Type Information signal 364 as "Request 1 Frame Memory. " After step 635, process 525 terminates. At step 625, if the output format supports inter frame coding, then the decision process follows the rules in FIG. 8.

With respect to FIG. 8, at step 650, if isFrameStruc is equal to 1 and isFieldStruct is equal to 0 and isFrameMC is equal to 1 and isFieldMC is equal to 0 and isSpecialMC is equal to 0 and isFrameDCT is equal to 1 and isFieldDCT is equal to 0, then step 665 is entered. In this case, field based coding is not used in the bitstream. Therefore, it is possible to transcode without decoding DCT coefficients and no decoding process is required. After step 665, process 525 terminates. In the case of FIG. 3, transcoding manager 340 sends a TransCoding Type Information signal 364 as "Enable Transcoding without Decoding" to transcoding device 350. When transcoding device 350 receives this, it does not allocate any frame memories for the transcoding process.

If the isFieldStruct is equal to 1, the isFieldMC is equal to 1 or the sFieldDCT is equal to 1, then step 670 of FIG. 8 is entered because field based coding is used in this bitstream. At step 670, if the output format supports the field based coding, then it may be possible to transcode without decoding DCT coefficients and step 660 is entered. At step 660, if isSpecialMC is equal to 0, it is possible to transcode without decoding DCT coefficients and step 665 is entered. In the case of FIG. 3, transcoding manager 340 sends a TransCoding Type Information signal 364 as "Enable Transcoding without Decoding" to transcoding device 350. When transcoding device 350 receives this, it does not allocate any frame memories for the transcoding process.

At step 670 of FIG. 8, if the output format does not support field coding, then step 675 is entered. At step 675, the transcoding device 350 needs to decode the DCT coefficients of the MM Contents and at least one frame memory is necessary to transcode. In the case of FIG. 3, the transcoding manager 340 sends a TransCoding Type Information signal as "Request 1 Frame Memory" to the transcoding device 350 and a flag is set that indicates decoding is required. It is appreciated that after steps 665 and 675, process 525 terminates.

With respect to FIG. 7, if isI_Picture is equal to 1, isP_Picture is equal to 1 and isB_Picture is equal to 1, then step 630 is entered. In this case, B Pictures are used in the bitstream (MM Contents). If the output. format also supports the B Picture, then step 680 of FIG. 9 is entered and it may be possible to transcode without decoding the DCT coefficients of the MM Contents. However, if the output format only supports the I and P Picture, such as in the H.261 and H.263 formats, then step 640 is entered and DCT coefficients need to be decoded.

At step 640, the output format does not support the B picture and the transcoding device 350 needs to decode the DCT coefficients of the MM Contents. Moreover, in this case at least two frame memory space is necessary to transcode. In the case of FIG. 3, transcoding manager 340 sends TransCoding Type Information signal as "Request 2 Frame Memories" to the transcoding device 350. After step 640, process 525 terminates.

At step 630 of FIG. 7, if the output format supports B picture, then the decision process follows the rules in FIG. 9. With respect to FIG. 9, if isFrameStruc is equal to 1 and isFieldStruct is equal to 0 and isFrameMC is equal to 1 and isFieldMC is equal to 0 and isSpecialMC is equal to 0 and isFrameDCT is equal to 1 and isFieldDCT is equal to 0, then 695 is entered. In this case, field based coding is not used in the bitstream. Therefore, it is possible to transcode without decoding DCT coefficients. In the case of FIG. 3, transcoding manager 340 sends TransCoding Type Information signal as "Enable Transcoding without Decoding" to transcoding device 350. When transcoding device 350 receives this, it does not allocate any frame memories for transcoding process. After step 695, process 525 terminates.

With respect to FIG. 9, if one of the isFieldStruct, isFieldMC or isFieldDCT is equal to 1, then step 710 is entered. In this case, field based coding is used in this bitstream. If the output format supports the field based coding, then step 690 is entered and it may be possible to transcode without decoding DCT coefficients of the MM Contents. At step 690, if isSpecialMC is equal to 0, it is possible to transcode without decoding DCT coefficients and step 695 is entered. In the case of FIG. 3, transcoding manager 340 sends TransCoding Type Information signal as "Enable Transcoding without Decoding" to transcoding device 350. When transcoding device 350 receives this, it does not allocate any frame memories for transcoding process. After step 695, process 525 terminates.

At step 715 of FIG. 9, transcoding device 350 needs to decode the DCT coefficients of the MM Contents and at least two frame memory space is necessary to transcode. In the case of FIG. 3, transcoding manager 340 sends the TransCoding Type Information signal as "Request 2 Frame Memories" to the transcoding device 350.

COMPUTER SYSTEM PLATFORM

Figure 10:
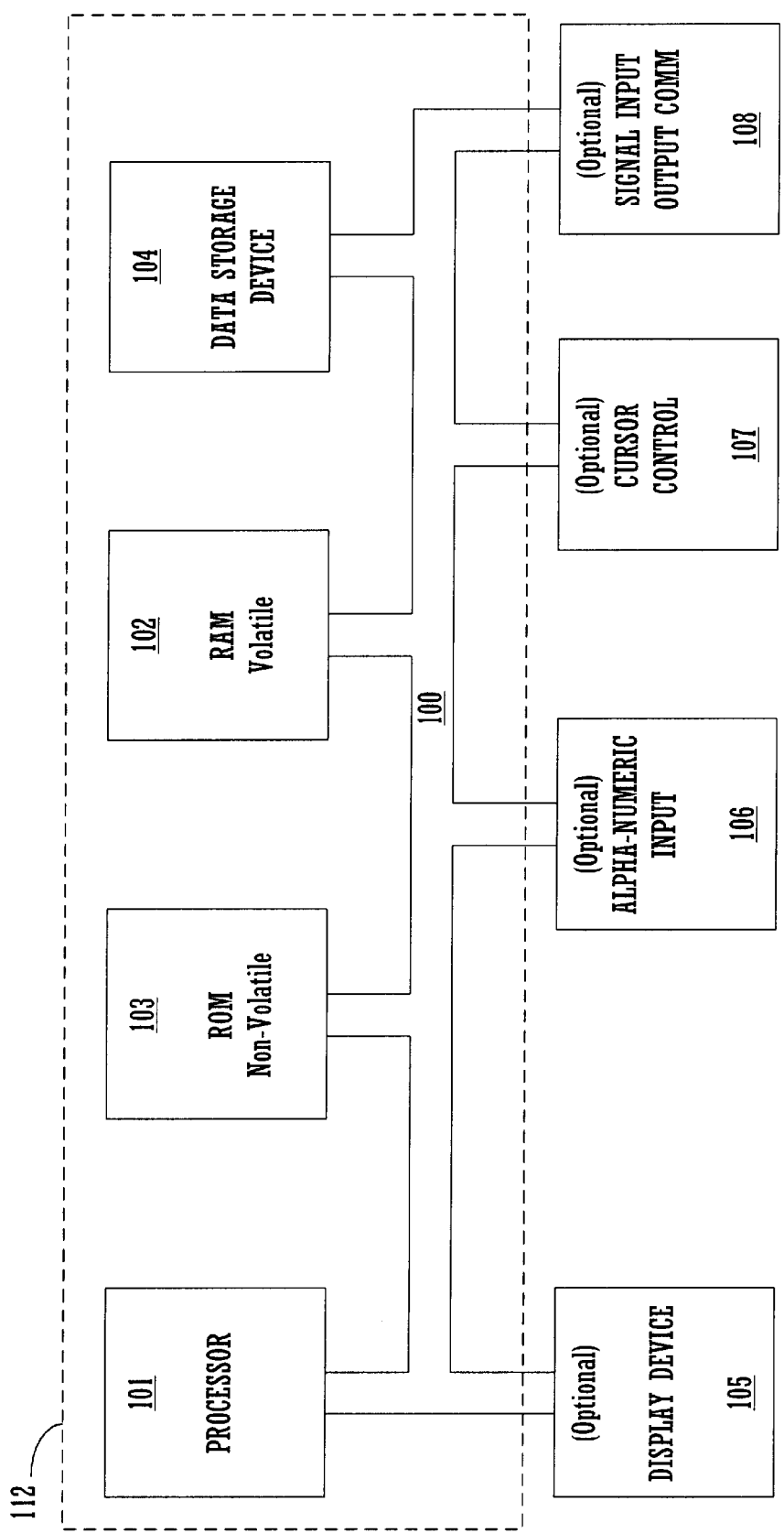
FIG. 10 is a block diagram of a computer system platform on which embodiments of the present invention can be practiced.

FIG. 10 illustrates a general purpose computer system 112 that, in one embodiment, can be embedded within the data access server 220 of the present invention. Computer system 112 can be used as a platform for executing the processes of FIG. 6, FIG. 7, FIG. 8 and FIG. 9. Computer system 112 includes an address/data bus 100 for communicating information, a central processor 101 coupled with the bus for processing information and instructions, a volatile memory 102 (e.g., random access memory RAM) coupled with the bus 100 for storing information and instructions for the central processor 101 and a non-volatile memory 103 (e.g., read only memory ROM) coupled with the bus 100 for storing static information and instructions for the processor 101. Computer system 112 also includes a data storage device 104 ("disk subsystem") such as a magnetic or optical disk and disk drive coupled with the bus 100 for storing information and instructions and a display device 105 coupled to the bus 100 for displaying information to the computer user.

Also included in computer system 112 of FIG. 10 is an optional alphanumeric input device 106 including alphanumeric and function keys coupled to the bus 100 for communicating information and command selections to the central processor 101. System 112 also includes an optional cursor control or directing device 107 coupled to the bus for communicating user input information and command selections to the central processor 101. The cursor directing device 107 can be implemented using a number of well known devices such as a mouse, a track ball, a track pad, an electronic pad and stylus, an optical tracking device, a touch screen etc. The display device 105 utilized with the computer system 112 is optional and may be a liquid crystal device, cathode ray tube (CRT), field emission device (FED, also called flat panel CRT) or other display device suitable for creating graphic images and alphanumeric characters recognizable to the user.

The preferred embodiment of the present invention, a multimedia information retrieval system and method including a method and system for automatic format conversion, is thus described. While the present invention has been described in particular embodiments, it should be appreciated that the present invention should not be construed as limited by such embodiments, but rather construed according to the below claims.

What is claimed is:

1. A method for processing multimedia information comprising the steps of:
   a) responsive to a request signal from a client, accessing a portion of encoded multimedia information from a database storing encoded multimedia information;
   b) accessing contents information describing an encoding format of said portion of encoded multimedia information and accessing client information describing a decoding format of said client; and
   c) automatically transcoding said portion of encoded multimedia information to generate transcoded multimedia information based on said contents and client information, wherein said transcoded multimedia information is compatible with said decoding format of said client.

2. A method as described in claim 1 wherein said step c) comprises the steps of:
   c1) based on said contents and client information, automatically determining whether or not decoding is required of said portion of encoded multimedia information;
   c2) provided decoding is required, automatically determining memory resources required to decode said portion of encoded multimedia information;
   c3) provided decoding is required, decoding said portion of encoded multimedia information to produce decoded multimedia information; and
   c4) based on said contents and client information, transcoding said decoded multimedia information to provide said transcoded multimedia information.

3. A method as described in claim 1 wherein said step c) comprises the steps of:
   c1) based on said contents and client information, automatically determining that decoding is not required of said portion of encoded multimedia information; and
   c2) based on said contents and client information, transcoding said encoded multimedia information to provide said transcoded multimedia information.

4. A method as described in claim 1 further comprising the step of d) transmitting said transcoded multimedia information to said client.

5. A method as described in claim 1 wherein said step a) comprises the step of receiving said client information from said client and wherein said portion of encoded multimedia information is a digital bitstream.

6. A method as described in claim 1 wherein said contents information comprises picture type information indicative of encoded picture types within said portion of encoded multimedia information.

7. A method as described in claim 6 wherein said picture type information comprises a flag for I-pictures, a flag for P-pictures and a flag for B-pictures.

8. A method as described in claim 6 wherein said contents information further comprises picture structure information indicative of a type of structure used in said portion of encoded multimedia information.

9. A method as described in claim 6 wherein said contents information further comprises motion compensation information indicative of a type of motion compensation used in said portion of encoded multimedia information.

10. A method as described in claim 9 wherein said motion compensation information comprises frame and field motion compensation flags.

11. A method as described in claim 6 wherein said contents information further comprises discrete cosine transform (DCT) information indicative of a type of DCT coefficients used in said portion of encoded multimedia information.

12. A method as described in claim 11 wherein said DCT information comprises frame and field DCT flags.

13. An electronic system comprising:
   a processor coupled to a bus; and
   a memory coupled to said bus, wherein said memory comprises instructions stored thereon that implement a method for processing multimedia information comprising the steps of:
   a) responsive to a request signal from a client, accessing a portion of encoded multimedia information from a database storing encoded multimedia information;
   b) accessing contents information describing an encoding format of said portion of encoded multimedia information and accessing client information describing a decoding format of said client; and c) automatically transcoding said portion of encoded multimedia information to generate transcoded multimedia information based on said contents and client information, wherein said transcoded multimedia information is compatible with said decoding format of said client.

14. An electronic system as described in claim 13 wherein said step c) comprises the steps of:

c1) based on said contents and client information, automatically determining whether or not decoding is required of said portion of encoded multimedia information;

c2) provided decoding is required, automatically determining memory resources required to decode said portion of encoded multimedia information;

c3) provided decoding is required, decoding said portion of encoded multimedia information to produce decoded multimedia information; and c4) based on said contents and client information, transcoding said decoded multimedia information to provide said transcoded multimedia information.

15. An electronic system as described in claim 13 wherein said step c) comprises the steps of:

c1) based on said contents and client information, automatically determining that decoding is not required of said portion of encoded multimedia information; and c2) based on said contents and client information, transcoding said encoded multimedia information to provide said transcoded multimedia information.

16. An electronic system as described in claim 13 wherein said method further comprises the step of d) transmitting said transcoded multimedia information to said client.

17. An electronic system as described in claim 13 wherein said step a) comprises the step of receiving said client information from said client and wherein said portion of encoded multimedia information is a digital bitstream.

18. An electronic system as described in claim 13 wherein said contents information comprises picture type information indicative of encoded picture types within said portion of encoded multimedia information.

19. An electronic system as described in claim 18 wherein said picture type information comprises a flag for I-pictures, a flag for P-pictures and a flag for B-pictures.

20. An electronic system as described in claim 18 wherein said contents information further comprises picture structure information indicative of a type of structure used in said portion of encoded multimedia information.

21. An electronic system as described in claim 18 wherein said contents information further comprises motion compensation information indicative of a type of motion compensation used in said portion of encoded multimedia information.

22. An electronic system as described in claim 21 wherein said motion compensation information comprises frame and field motion compensation flags.

23. An electronic system as described in claim 18 wherein said contents information further comprises discrete cosine transform (DCT) information indicative of a type of DCT coefficients used in said portion of encoded multimedia information.

24. An electronic system as described in claim 23 wherein said DCT information comprises frame and field DCT flags.

25. A multimedia system comprising:

a client system;

a multimedia contents server containing encoded multimedia information and contents information describing said multimedia information; and a data access server coupled to said client system and to said multimedia contents server and responsive to a request signal from said client system for accessing a portion of encoded multimedia information from said multimedia contents server and for accessing contents information describing an encoding format of said portion of encoded multimedia information and accessing client information describing a decoding format of said client system, said data access server also for automatically transcoding said portion of encoded multimedia information to generate transcoded multimedia information based on said contents and client information wherein said transcoded multimedia information is compatible with said decoding format of said client system.

26. A system as described in claim 25 wherein said data access server comprises:

a transcoding manager that, based on said contents and client information, automatically determines whether or not decoding is required of said portion of encoded multimedia information and, provided decoding is required, automatically determines memory resources required to decode said portion of encoded multimedia information; and a transcoder that, provided decoding is required, decodes said portion of encoded multimedia information to produce decoded multimedia information and based on said contents and client information and further transcodes said decoded multimedia information to provide said transcoded multimedia information.

27. A multimedia system as described in claim 25 wherein said contents information comprises picture type information indicative of encoded picture types within said portion of encoded multimedia information.

28. A multimedia system as described in claim 27 wherein said contents information further comprises picture structure information indicative of a type of structure used in said portion of encoded multimedia information.

29. A multimedia system as described in claim 28 wherein said contents information further comprises motion compensation information indicative of a type of motion compensation used in said portion of encoded multimedia information.

* * * * *